W. C. Marr.
Drill & Saw Gummer.
Nº 92,983.  Patented Jul. 27, 1869.

Witnesses.

Inventor;
W C Marr

Attorneys.

United States Patent Office.

WILLIAM C. MARR, OF PERU, WISCONSIN.

Letters Patent No. 92,983, dated July 27, 1869.

IMPROVEMENT IN COMBINED DRILL AND SAW-GUMMER.

The Schedule referred to in these Letters Patent and making part of the same.

*To all whom it may concern:*

Be it known that I, WILLIAM C. MARR, of Peru, in the county of Dunn, and State of Wisconsin, have invented a new and improved Combined Drill and Saw-Gummer; and I do hereby declare that the following is a full, clear, and exact description thereof, which will enable others skilled in the art to make and use the same, reference being had to the accompanying drawing, forming part of this specification, in which—

Similar letters of reference indicate corresponding parts.

My invention has for its object to furnish a simple, convenient, and effective machine, which may be readily used as a drill or saw-gummer, as occasion may require, doing its work equally well in either capacity; and It consists in the construction and combination of the various parts of the machine, as hereinafter more fully described.

A is the body, bar, or frame of the machine, which is formed with an upwardly-projecting arm, or bracket, $a'$, to form a bearing for the outer end of the drill-shaft.

The drill-shaft B is perforated longitudinally, the lower part of said perforation being enlarged to serve as a socket, to receive the shank of the drill.

To the upper or outer end of the shaft B is attached a crank, C, by means of which the drill is operated.

The upper part of the shaft B is turned down, and has a sleeve, D, placed upon it, having a screw-thread cut upon it, which screws into a screw-thread cut in the perforation of the arm $a'$.

The sleeve D has a hand-wheel, $d'$, formed upon or attached to its upper end, so that the drill may be fed forward to its work, by turning the sleeve D forward.

The ends of the bar, or frame A project downward, and have jaws $a^2$ formed upon them, to receive the saw to be gummed, where it is secured in place when adjusted, and securely held while being gummed by the set-screws E.

In case the saw is very thin, it may be supported while being gummed by the cross-bar F, the ends of which rest in recesses formed in the jaws $a^2$.

Figure 1:
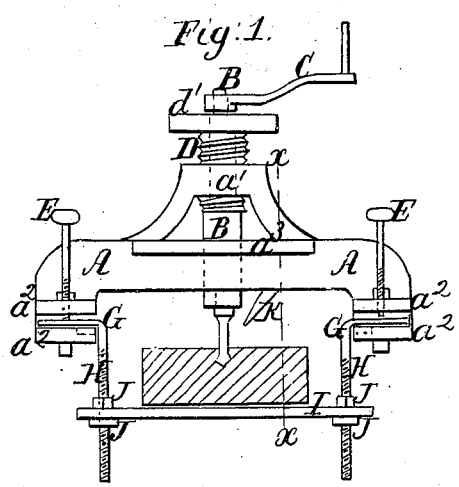
Figure 1 is a side view of my improved machine, arranged as a drill.
Figure 2:
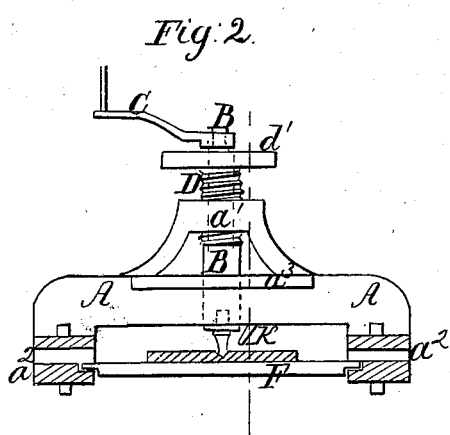
Figure 2 is a side view of the same, arranged as a gummer.

When the machine is to be used as a drill, the flanged plates G, attached to the upper ends of the screws H, are inserted in the jaws $a^2$, and are screwed in said jaws by the set-screws E, as shown in fig. 1.

Figure 3:
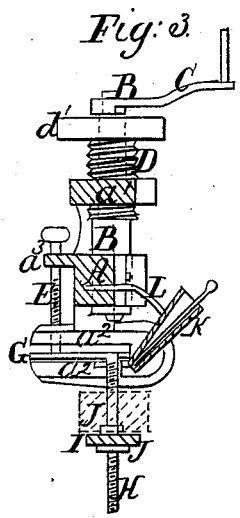
Figure 3 is a detail sectional view of the same, taken through the line $x$–$x$, fig. 1.

The material to be drilled is placed upon the cross-bar I, through holes in the ends of which the screws H pass, and which is adjustably secured in place by the nuts J, placed one above and another below each end of the said bar I, as shown in figs. 1 and 3.

Upon one side of the main bar A is formed a flange, $a^3$, by means of which the machine may be secured in a vise, when desired.

It should be observed that the machine may be used with equal facility in a horizontal or vertical position, as the character of the work to be done may require.

K is the oiler, which I prefer to make conical in shape, and which is connected to the bar or frame A by the bent stem L, which is inserted in a hole in said bar, so that the position of the oiler may be adjusted according to the position in which the machine is to be used.

The oil escapes through a small hole in the point of the oil-pot K, and its flow may be regulated as desired by a small wooden plug inserted in the hole of the oiler, and which should be made of such a length as to project above the upper end of the oil-pot K, so that it may be conveniently grasped, when required.

Having thus described my invention,

What I claim as new, and desire to secure by Letters Patent, is—

1. The bar or frame A $a'$, drill-shaft B, screw-sleeve D $d'$, jaws $a^2$, and set-screws E, in combination with each other, substantially as herein shown and described, and for the purpose set forth.

2. The combination of the flange plates G, screws H, bar I, and nuts J, with each other and with the jaws $a^2$ of the frame or bar A $a'$, substantially as herein shown and described, and for the purpose set forth.

3. The oiler K L, constructed as described, in combination with the bar or frame A of the machine, substantially as herein shown and described, and for the purpose set forth.

WILLIAM C. MARR.

Witnesses:
G. DOWD,
J. CODINGTON.